Figure 1:
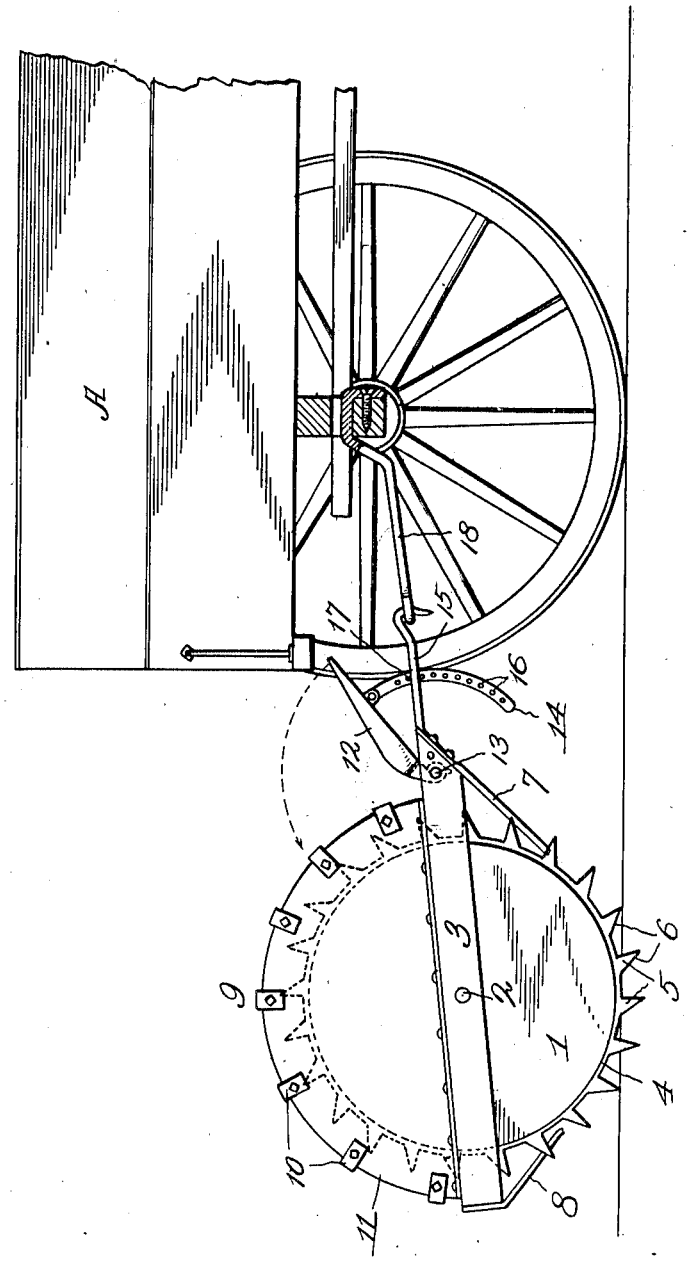

C. SHABLEY.
MANURE SPREADER.
APPLICATION FILED JUNE 23, 1913.

1,088,842.

Patented Mar. 3, 1914.
2 SHEETS—SHEET 1.

WITNESSES:
R. E. Hamilton
L. J. Fischer

INVENTOR:
Charles Shabley,
BY
F. G. Fischer,
ATTORNEY.

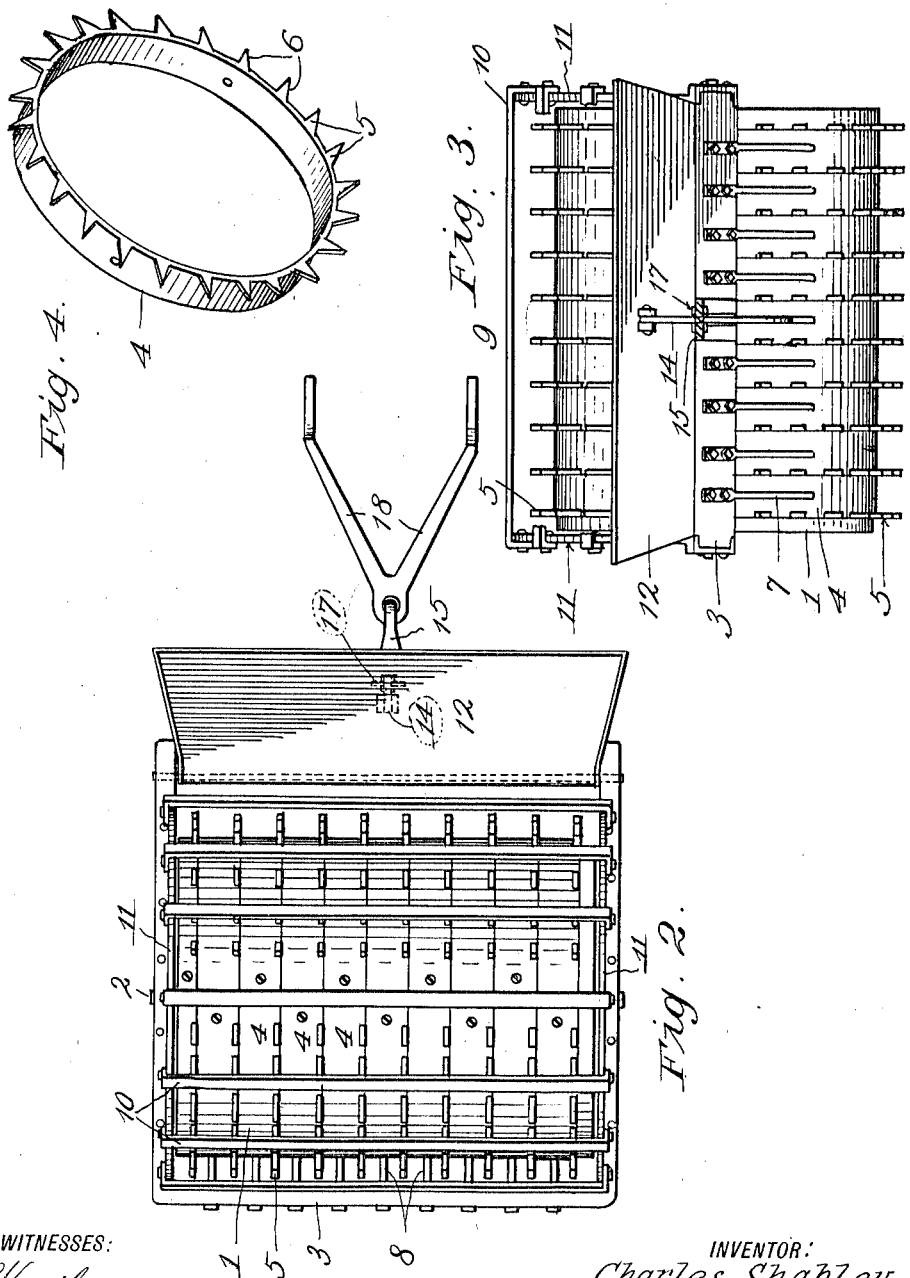

UNITED STATES PATENT OFFICE.

CHARLES SHABLEY, OF LEAVENWORTH, KANSAS, ASSIGNOR OF ONE-HALF TO ANDREW T. THOMPSON, OF LEAVENWORTH, KANSAS.

MANURE-SPREADER.

1,088,842.	Specification of Letters Patent.	Patented Mar. 3, 1914.

Application filed June 23, 1913. Serial No. 775,177.

*To all whom it may concern:*

Be it known that I, CHARLES SHABLEY, a citizen of the United States, residing at Leavenworth, in the county of Leavenworth and State of Kansas, have invented certain new and useful Improvements in Manure-Spreaders, of which the following is a specification.

My invention relates to improvements in manure spreaders, and my object is to provide a simple, inexpensive, machine of this character, whereby manure may be broken up into small particles and distributed evenly over the surface of a field.

A further object is to provide a machine of this character which will pack the manure into the soil, so that it cannot be readily washed or blown away.

My machine is adapted to be coupled to the rear of an ordinary farm wagon from which the manure is fed to the machine, as the same is drawn back and forth over a field.

In order that the invention may be fully understood, reference will now be made to the accompanying drawings, in which:

Figure 1 is a side elevation of the manure spreader coupled to the rear portion of a wagon. Fig. 2 is a plan view of the manure spreader. Fig. 3 is a front elevation of the manure spreader with a part thereof broken away. Fig. 4 is a detail perspective of a toothed-band employed in carrying out the invention.

A designates a wagon for carrying a supply of manure to be distributed over the ground.

1 designates a ground roller mounted upon an axle 2, journaled in a rectangular frame 3.

4 designates a plurality of abutting bands, each containing a peripheral row of teeth 5. The bands 4 are fixedly-secured to the periphery of the roller 1, which is reinforced thereby, and teeth 5 are beveled on one side as indicated at 6, to pass out of the soil without tearing up the same.

7 designates a plurality of rods secured to the front side of the frame 3 and inclined downwardly and rearwardly to a point adjacent the bands 4. Each rod 7 extends between two rows of teeth 5 to coact therewith in breaking up lumps of manure and spreading the same uniformly over the surface of the ground.

8 designates a plurality of cleaners or fingers secured to the rear side of frame 3 and inclined forwardly to a point adjacent the bands 4. The free end of each finger 8, like the free end of each rod 7, is arranged between two rows of teeth 5, so that should the same pick up stalks or other trash from the ground they will be freed thereof by said fingers 8.

9 designates a guard covering the upper portion of the roller to prevent the operator from coming into contact with the teeth 5. Said guard comprises a series of slats 10 and a pair of segmental end plates 11, the latter being united by the former and firmly secured to the sides of the frame 3.

12 designates an adjustable apron for directing the manure to the rods 7 and the roller 1. Apron 12 is mounted upon a rod 13 pivotally-mounted in the sides of frame 3, so that said apron may be folded back against the guard 9 when desired.

14 designates a segmental arm pivotally-secured to the apron 12 to hold the same in any of its adjusted positions. Arm 14 passes through a hook 15 and has a series of holes 16 to receive a pin 17 adapted to rest upon the hook 15 and thus hold said segmental arm 14 in any of its adjusted positions. Hook 15 is secured to the central front portion of frame 3 and adapted to rest upon the hook 15 and thus hold said segmental arm 14 in any of its adjusted positions. Hook 15 is secured to the central front portion of frame 3 and adapted to engage a draft-bar 18, extending rearwardly from the rear axle of the wagon A to within convenient reach of the operator, so that he may couple the hook 15 to said draft-bar 18 without getting beneath the wagon.

In practice the manure spreader is drawn over a field behind the wagon A, from which the manure is pitched on to apron 12, whereby it is guided down between the teeth 5 and the rods 7. As the teeth 5 pass between the rods 7 they break up the manure into small particles and distribute it upon the surface of the field into which a part of the manure is sunk by the teeth 5, which in this respect act somewhat in the manner of a grain-drill. What manure is left lying loosely upon the ground is packed therein by the roller 1, hence there will be little or no loss of manure by wind or rain. The teeth 5 also perforate the surface of the soil, so that rain can readily enter therein.

In order that easy access may be had to the draft-bar 18, to engage or disengage the same with the hook 15, the apron 12 is folded back against the guard 9, as indicated by the arrow, Fig. 1.

When I use the word "manure" in the description and claims, I wish to be understood as referring to any fertilizer that can be handled to advantage by my machine.

Having thus described my invention, what I claim and desire to secure by Letters Patent is:

1. A manure spreader, consisting of a ground roller, means for supplying manure to said roller, peripheral teeth upon said roller to break up the manure and force it into the soil, and means coacting with said teeth to break up the manure.

2. A manure spreader, consisting of a roller, peripheral teeth upon said roller, a frame in which said roller is mounted, an apron at the front end of said frame, and means beneath said apron to direct manure therefrom to the teeth.

3. A manure spreader, consisting of a roller, peripheral teeth on said roller, a frame in which said roller is mounted, an apron pivotally-mounted upon said frame in advance of the roller, and means for holding said apron in any of its adjusted positions.

4. A manure spreader, consisting of a roller, peripheral teeth upon said roller, a frame in which said roller is mounted, an apron pivotally-mounted upon said frame in advance of the roller, a perforated segmental arm connected to said apron to secure it in any of its adjusted positions, a draft appliance upon the forward portion of the frame having an opening through which said segmental arm extends, and a pin adapted to pass through one of the perforations in said segmental arm and engage the draft appliance.

5. A manure spreader, consisting of a roller, peripheral teeth upon said roller, a frame in which said roller is mounted, means to direct manure to said teeth, a hook at the forward portion of the frame, and a draft-bar adapted to be secured to the rear portion of a vehicle and engage the forward end of said hook.

In testimony whereof I affix my signature, in the presence of two witnesses.

CHARLES SHABLEY.

Witnesses:
   F. G. FISCHER,
   L. J. FISCHER.